(12) United States Patent
Ossipov

(10) Patent No.: US 11,652,789 B2
(45) Date of Patent: May 16, 2023

(54) CONTEXTUAL ENGAGEMENT AND DISENGAGEMENT OF FILE INSPECTION

(71) Applicant: Cisco Technology, Inc., San Jose, CA (US)

(72) Inventor: Andrew E. Ossipov, Lewisville, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 420 days.

(21) Appl. No.: 16/454,911

(22) Filed: Jun. 27, 2019

(65) Prior Publication Data

US 2020/0412692 A1 Dec. 31, 2020

(51) Int. Cl.
| G06F 9/00 | (2006.01) |
| G06F 15/16 | (2006.01) |
| G06F 17/00 | (2019.01) |
| H04L 9/40 | (2022.01) |

(52) U.S. Cl.
CPC ...... *H04L 63/0209* (2013.01); *H04L 63/0227* (2013.01); *H04L 63/145* (2013.01)

(58) Field of Classification Search
CPC . H04L 63/0209; H04L 63/0263; H04L 63/20; H04L 63/0218; H04L 63/0236
USPC .......................................................... 726/11
See application file for complete search history.

(56) References Cited

U.S. PATENT DOCUMENTS

| 9,584,535 B2 | 2/2017 | Roesch |
| 10,033,794 B2 | 7/2018 | Perahia et al. |
| 2010/0011435 A1 | 1/2010 | Wee et al. |
| 2010/0088756 A1* | 4/2010 | Balakrishnan ...... H04L 63/1408 726/13 |
| 2012/0042134 A1 | 2/2012 | Risan |
| 2014/0189879 A1 | 7/2014 | Ruan et al. |
| 2014/0226474 A1* | 8/2014 | Janarthanan ............ H04L 45/22 370/230 |
| 2015/0215285 A1* | 7/2015 | Fleury .................... H04L 67/10 726/13 |
| 2015/0256431 A1 | 9/2015 | Buchanan et al. |
| 2017/0142144 A1* | 5/2017 | Weinberger ......... H04L 63/1408 |
| 2018/0091557 A1* | 3/2018 | Komu ..................... H04L 63/08 |
| 2018/0309784 A1* | 10/2018 | Chen .................. H04L 63/0435 |
| 2019/0207860 A1* | 7/2019 | York ..................... H04L 43/103 |

* cited by examiner

*Primary Examiner* — Brandon Hoffman
*Assistant Examiner* — Samuel Ambaye
(74) *Attorney, Agent, or Firm* — Edell, Shapiro & Finnan, LLC

(57) ABSTRACT

Methods and apparatuses providing file type inspection in firewalls by moving the flow between deep inspection file and lightweight accelerated paths. The method includes obtaining, by a network security device, a packet flow of a file transfer session in which at least two files are transferred and determining, by the network security device, at least an offset parameter based on at least one attribute of at least a first packet in the packet flow. The offset parameter is for a first file being transferred of the at least two files and relates to an expected positon of a control data sequence within the packet flow. In this method, based on the offset parameter, directing, by the network security device, to an accelerated packet inspection path instead of to a deep packet inspection path, a portion of the packet flow including one or more packets that follow the first packet.

20 Claims, 6 Drawing Sheets

400

402 — OBTAINING, BY A NETWORK SECURITY DEVICE, A PACKET FLOW OF A FILE TRANSFER SESSION IN WHICH AT LEAST TWO FILES ARE TRANSFERRED

404 — DETERMINING, BY THE NETWORK SECURITY DEVICE, AT LEAST AN OFFSET PARAMETER BASED ON AT LEAST ONE ATTRIBUTE OF AT LEAST A FIRST PACKET IN THE PACKET FLOW, THE OFFSET PARAMETER IS FOR A FIRST FILE BEING TRANSFERRED OF THE AT LEAST TWO FILES AND RELATES TO AN EXPECTED POSITON OF A CONTROL DATA SEQUENCE WITHIN THE PACKET FLOW

406 — BASED ON THE OFFSET PARAMETER, DIRECTING, BY THE NETWORK SECURITY DEVICE, TO AN ACCELERATED PACKET INSPECTION PATH INSTEAD OF TO A DEEP PACKET INSPECTION PATH, A PORTION OF THE PACKET FLOW COMPRISING ONE OR MORE PACKETS THAT FOLLOW THE FIRST PACKET

FIG.4

CONTEXTUAL ENGAGEMENT AND DISENGAGEMENT OF FILE INSPECTION

TECHNICAL FIELD

The present disclosure relates to network security devices.

BACKGROUND

Many next generation firewalls enable file inspection to permit and block transfers based on application level awareness. That is, next generation firewalls provide for a deep packet inspection that goes beyond port/protocol inspection performed by traditional firewalls, and adds application-level inspection, intrusion prevention, and additional intelligence. Using next generation firewalls, enterprises are able to block malware from entering their network because of such application level awareness. Using application level awareness, a network administrator may configure next generation firewalls to permit/block transfers based on a file type. For example, a media company may allow its employees (journalists) to transfer video files to the media company's server using a server message block (SMB) protocol, but block transfers of any other files. A next generation firewall provides a secure approach to enforce this policy by using deep packet inspection of every packet in the session. Next generation firewalls also provide a secure approach to enforcing other polices, as well, by inspecting each and every packet of the session flow using deep packet inspection.

BRIEF DESCRIPTION OF THE DRAWINGS

FIG. 4 is a flowchart illustrating a method for offloading a packet flow as part of a process for contextual engagement and disengagement of file inspection, according to an example embodiment.

DESCRIPTION OF EXAMPLE EMBODIMENTS

Overview

Figure 1:
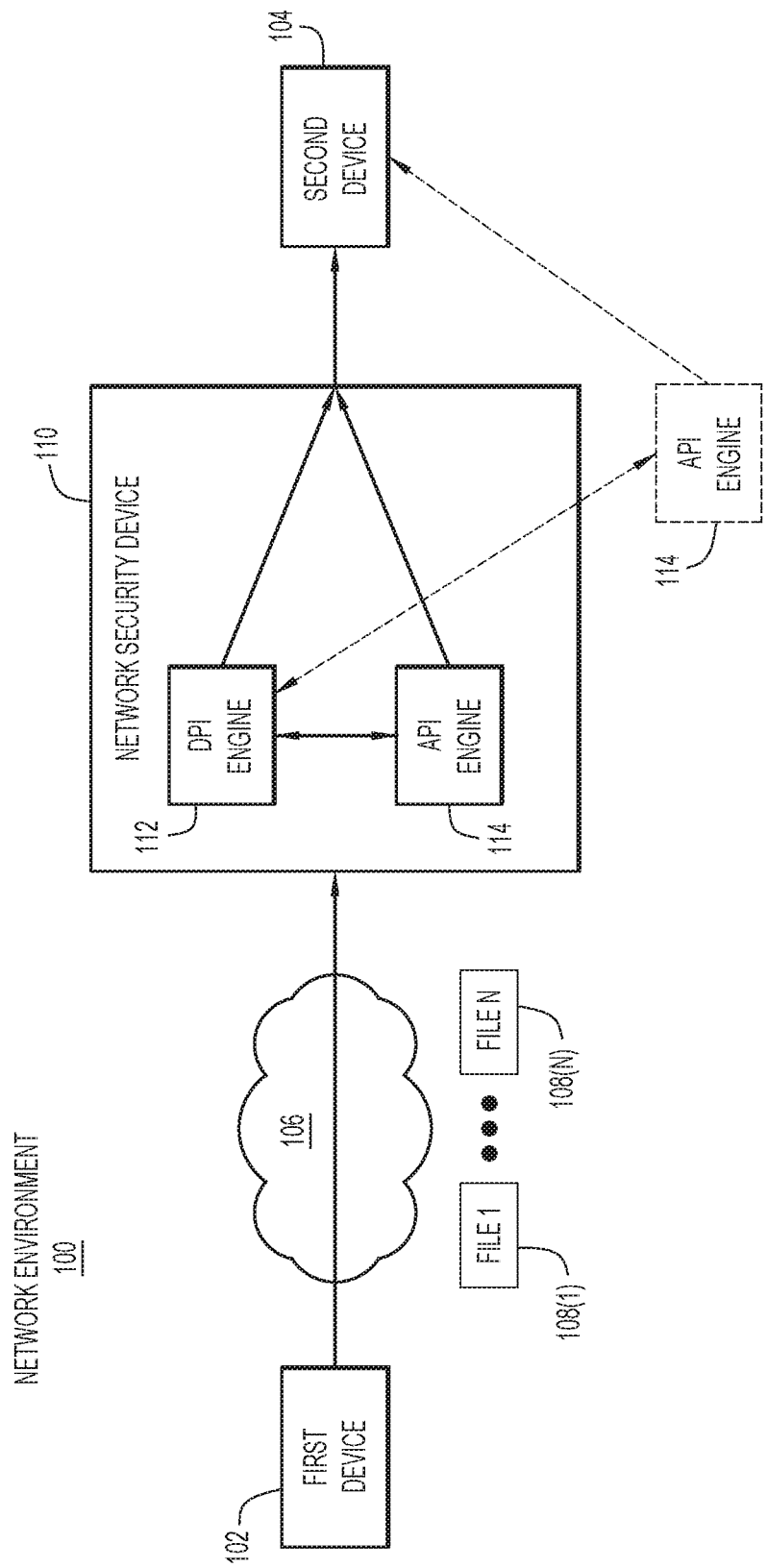
FIG. 1 is a block diagram illustrating a network environment that includes a network security device configured to perform offloading of packet flows for contextual engagement and disengagement of file inspection, according to an example embodiment.

In one example embodiment, a method is provided in which a file transfer session is established that involves at least two files transferred in a packet flow. A network security device that resides in the path of the packet flow determines at least an offset parameter based on at least one attribute of at least a first packet in the packet flow. The offset parameter is for a first file being transferred of the at least two files and relates to an expected positon of a control data sequence within the packet flow. Based on the offset parameter, the network security device directs, to an accelerated packet inspection path instead of to a deep packet inspection path, a portion of the packet flow that includes one or more packets that follow the first packet.

In another example embodiment, a method is provided in which the network security device dynamically directs, to an accelerated packet inspection path instead of to a deep packet inspection path, at least a portion of the packet flow, which includes a part of a first file being transferred from among the at least two files. The directing is based on an expected location within the packet flow of a file type attribute of the first file. The method further includes dynamically interrupting the directing of the packet flow to the accelerated packet inspection path and returning the packet flow to the deep packet inspection path, based on a payload size of a packet in the portion of the packet flow directed to the accelerated packet inspection path being less than an expected payload size.

Example Embodiments

During a file transfer, a file type can typically be identified after inspecting only the first few packets of a transfer session. However, a firewall executed on a network security device, for example, cannot disengage deep packet inspection since multiple files may be transferred in a single session. If deep packet inspection was to disengage immediately after detecting a file type of a first file in the transfer session, subsequent files that violate the policy may be inadvertently permitted by the firewall. Thus, the firewall needs to inspect every packet of all file transfer sessions; thereby, providing the most secure approach to enforcing file policies. This, however, creates a single-flow performance constraint, which negatively impacts the protected applications. In other words, deep packet inspection of every packet may be detrimental to performance. Further, it may be desirable to avoid deep packet inspection of flows that require low latency (e.g., real-time financial trading application flows) or flows with a low likelihood of being malicious (e.g., trusted back-up flows) that do not require deep packet inspection. Also, when only detecting the file type and not enforcing other policies that may require full packet reassembly, deep packet inspection of each packet may not be needed. However, it is still necessary to not allow other file types to bypass the policy. In short, for both high-throughput flows and other flows for which low-latency is beneficial and/or deep packet inspection may not be necessary, the ability to increase flow throughput while maintaining some visibility at a network security device is desirable.

In an example embodiment, increased performance of a file type inspection in firewalls is provided by moving a packet flow between a deep packet inspection path (typically executed by a firewall) and a lightweight accelerated path (in which detailed file inspection is omitted) based on anticipated file transfer lengths and/or packet payload sizes. In an example embodiment, throughput of a multi-file transfer over a single session is optimized by offloading a portion of the packet flow in between file read/write control messages into a (hardware-implemented or software-implemented) accelerated processing path. In an example embodiment, a file type is efficiently extracted from the packet flow without performing deep packet inspection on an entire packet flow. At least a portion of the packet flow may skip the deep packet inspection while still extracting attributes, such as a file type attribute, from the packet flow.

Reference is now made to FIG. 1. FIG. 1 is a block diagram illustrating a network environment 100 that includes a network security device 110 configured to perform offloading of packet flows as part of a contextual engagement and disengagement of file inspection process, according to an example embodiment. As shown in FIG. 1, the first device 102 transfers two or more files (Files 1-N) to a second device 104 via a network 106. The files are shown at reference numerals 108(1)-108(N).

In example embodiment, the first device 102 is a sending device or a client device such as a personal computer, a notebook, desktop computer, etc., or a mobile device such as a smart phone. The second device 104 may be a receiver device or a provider device such as server or a database system, for example, a storage system in an enterprise. These examples of first and second devices are not limiting. For example, the first device 102 and the second device 104 may be part of a data center with the second device 104 serving as a storage network device for the data center and the first device 102 serving as a computing device for the data center. The network 106 may include one or more public networks such as the Internet. Before these two or more files 108(1)-108(N) sent by the first device 102 reach the second device 104, they may be processed by a network security device 110. It is to be understood that file transfers can occur in both directions between the first device 102 and the second device 104. The read/write requests may generate file transfers in either direction.

The network security device 110 is a device that will inspect packets of the files being transferred (files 108(1)-108(N)) to the second device 104. The network security device 110 may be any type of device used for network traffic inspection, such as a firewall and/or an Intrusion Prevention System (IPS). The network security device 110 may be an edge switch or a router. The network security device 110 may be connected to the second device 104 via a private network, such as a local area network (not shown). The network security device 110 may be directly connected with the second device 104 via a cable or wirelessly. In an alternative example embodiment, the functions of the network security device 110 may be incorporated into the second device 104.

As shown in FIG. 1, the network security device 110 includes a deep packet inspection engine (hereinafter a DPI engine 112) and an accelerated packet processing engine (hereinafter an API engine 114). In one example embodiment, the API engine 114 may be external to the network security device 110. The DPI engine 112 and the API engine 114 may be implemented by software, hardware, or a combination of software and/or hardware, as explained in further detail below with reference to FIG. 6. As used herein, the network security device 110 may consist of one or more physical devices configured to apply security polices to the network traffic. According to some example embodiments, the network security device 110 may be a single physical device that includes the DPI engine 112 and the API engine 114. According to other example embodiments, the DPI engine 112 and the API engine 114 may be physically separate from each other. The API engine 114 may be a hardware entity that is physically separate from the network security device 110 that includes the DPI engine 112.

The DPI engine 112 processes incoming packets of the files 108(1)-108(N) by performing deep packet inspection. Deep packet inspection is a type of data processing that inspects in detail, data of the packet and of an entire file from the beginning to an end. The deep packet inspection processes each packet of each file in the transfer session. In an example embodiment, deep packet inspection includes packet disassembly and examination of the payload of the packet in addition to the header of the packet. The deep packet inspection may include checking whether the format of the data is correct i.e., corresponds to an expected format based on attributes provided in a header(s) and/or control data sequences in a packet flow which may include control packet(s) depending on a particular protocol. For example, a control data sequence is a sequence of bytes within a stream of data packets that allow the DPI engine 112 to identify a file type. These sequences may occur at any position in the file and are not present in protocol control messages. A control packet is a file transfer protocol message that typically does not include an actual file payload. While the control packets typically reference a file name and extension, they are not used by the DPI engine 112 to reliably identify a file type. The DPI engine 112 inspects actual data packets with a file payload in order to perform this identification.

The deep packet inspection may further include checking the packet for malicious code. The deep packet inspection examines the packet beyond Layers 2 and 3 of the Open Systems Interconnection (OSI) model such as at application Layer 7. The deep packet inspection examines the packet to determine if it violates various policies set by a network security device 110 or set by a network administrator. The deep packet inspection process may apply software-based security polices to a packet flow. The deep packet inspection protects the first device 102 or the second device 104 depending on the direction of the file transfer, and the network of the respective device from various policy violations and security breaches. However, the deep packet inspection process utilizes greater processing resources (i.e., a higher "CPU burden"), and thus results in lower throughput, and higher latency.

The API engine 114 performs accelerated packet processing of the incoming packets of the files 108(1)-108(N). In an example embodiment, the API engine 114 performs less intensive processing on the packets than that of deep packet inspection performed by the DPI engine 112. The API engine 114 may skip disassembly of the packets and the detailed examination of the header or the payload of the packets. In an example embodiment, the accelerated packet processing examines the packet only to determine its payload size or may forgo examination of the packets altogether until a predetermined packet is reached i.e., a predetermined byte in the file transfer. In an example embodiment, the accelerated packet processing performs minimal packet processing to increase the throughput, the speed of the file transfer, in contrast with the deep packet inspection. The API engine 114 may implement simple policies on the packet flow, such as Internet Protocol (IP) address Transport Control Protocol (TCP) port rewrites, based upon, for example, hardware instructions. Accordingly, the API engine 114 serves as an offload engine for the packet flow, with respect to the DPI engine 112. When offloaded to the API engine 114, full security policies are not applied to the packet flow, but the latency in processing the files 108(1)-108(N) is decreased as compared with the deep packet inspection performed by the DPI engine 112.

In an example embodiment, the files 108(1)-108(N) are transferred from the first device 102 to the second device 104 or vice versa in a packet flow via the network 106. The DPI engine 112 receives packets of the packet flow destined for one of the first device 102 or the second device 104, processes some of the received packets, and may offload a portion of the packet flow to the API engine 114. In an example embodiment, a portion of the packet flow is processed by the DPI engine 112 and another portion of the packet flow is proceeded by the API engine 114. The DPI engine 112 offloads the packet flow for processing to the API engine 114 based on various predetermined conditions, explained in greater detail below with reference to FIGS. 2-5. The API engine 114 returns the packet flow to the DPI engine 112 based on various predetermined conditions, as explained in greater detail below with reference to FIGS. 2-5. In an example embodiment, a single packet flow that may include multiple files is offloaded to the API engine 114, returned to the DPI engine 112 (the offload is interrupted) and then may return to be offloaded again to the API engine 114, based on various predetermined conditions.

Figure 2:
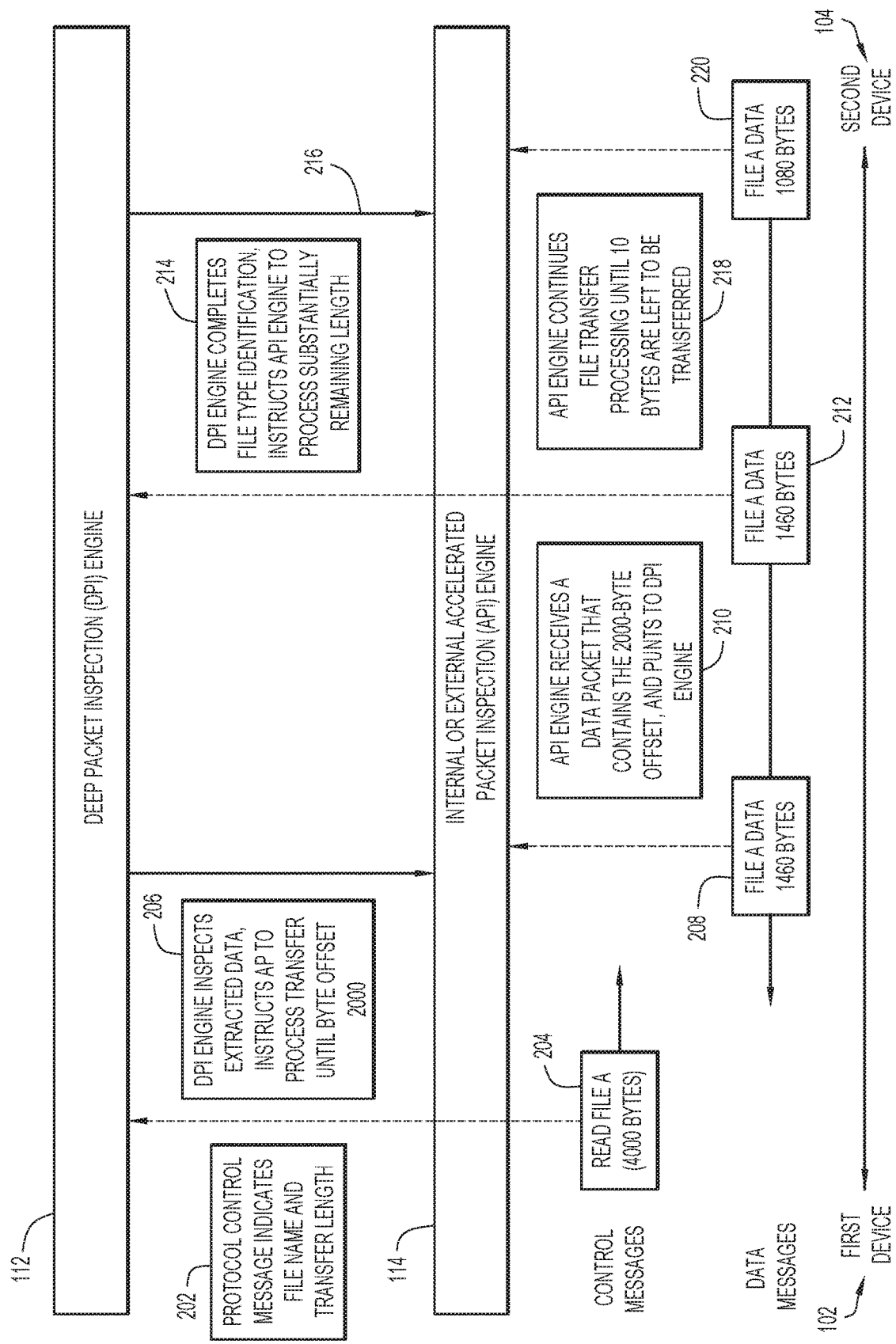
FIG. 2 is a functional flow diagram illustrating a method of offloading packet flows as part of a process for contextual engagement and disengagement of file inspection, according to an example embodiment.

Reference is now made to FIG. 2. FIG. 2 is a flow diagram illustrating a method of offloading packet flows for contextual engagement and disengagement of file inspection, according to an example embodiment.

In an example embodiment, depicted in FIG. 2, a Server Message Block (SMB) protocol is used to share files via a network between various devices such as between the first device 102 (a client device) and the second device 104 (a server). In the SMB protocol, the first device 102 transmits control messages indicating an operation to be performed and attributes of each file to be transferred. That is, each Read/Create/Write Request/Response message exchange of the SMB protocol contains information about the file such as a file name, a length of a file being transferred, and an optional offset for partial/resumed transfers. In an example embodiment, the network security device 110 (depicted in FIG. 1) utilizes this information to offload at least a portion of the packet flow to an accelerated packet inspection path. That is, the DPI engine 112 may offload at least a portion of the packet flow to the API engine 114. The API engine 114 may be internal (within the network security device 110) or external to the network security device 110. The API engine 114 provides an accelerated packet inspection processing, which is an accelerated packet inspection path for the packet flow.

As shown in FIG. 2, the DPI engine 112 intercepts a protocol control message sent by the first device 102. The protocol control message indicates a file name and transfer length, at 202. The protocol control message indicates a number of file attributes such as a file name and an expected transfer length of the file. That is, in an example embodiment, the DPI engine 112 inspects the control messages exchanged between the first device 102 and the second device 104 to extract attributes related to file transfer. The control messages include request messages from the first device 102 to the second device 104 and response messages from the second device 104 to the first device 102. Based on the control messages in, for example, an SMB2 TCP connection, the DPI engine 112 identifies attributes of the file that is to be created, edited/written to/modified, or read. The attributes include at least a name of the file and the expected file length. The attributes may further include an offset field. The DPI engine 112 may also optionally block partial file write operations based on a value of the offset field. That is, the DPI engine 112 prevents write operations that attempt to circumvent an inspection policy.

In an example embodiment, based on the intercepted protocol control message at 202, the DPI engine 112 determines that the control operation is a "read" operation, the file name is "File A", and the expected length of the file is 4000 bytes, "Read File A (4000 bytes)", as shown at 204.

At 206, the DPI engine 112 inspects the extracted metadata obtained at 202, and instructs the API engine 114 to process the file transfer until byte offset 2000. That is, the DPI engine 112 inspects first few data blocks (data) of a file being transferred. The first few data blocks (packets) identify a file type based on the embedded metadata or formatting in these few data blocks. If the first few packets of the session (the first few data blocks) point to a protocol that may carry a file type (e.g., signature) toward the end of the transfer, the deep packet inspection performed by the DPI engine 112 may also be temporarily disengaged. In an example embodiment, when the file type is identified, the DPI engine 112 calculates the remaining transfer size (~4000 bytes) and temporarily offloads processing of the file transfer (the packet flow) to an accelerated software or hardware path (e.g. a Flow Offload) executed by the API engine 114 until the byte count of the session approaches the total file length.

In an example embodiment depicted in FIG. 2, based on examining the first few packets, the DPI engine 112 determines that additional information about the file type (file signature) is provided in a middle of the file. Accordingly, the DPI engine 112 sets the byte offset to 2000 bytes. In an example embodiment, the byte offset value indicates the point at which the packet flow is to be returned to the DPI engine 112 for deep packet inspection. As shown in FIG. 2, the byte offset is set at 2000th byte. The packet flow is then offloaded to the API engine 114. In an example embodiment depicted in FIG. 2, the API engine 114 processes the packets of the packet flow without inspecting the content of these packets, and these packets (File A data) are provided to the first device 102, which requested to read File A from the second device 104. In an example embodiment, the data packets fast track back to the first device 102 via the API engine 114. The API engine 114 may pass the packets without any inspection or perform minimal inspection at Layer 3 and/or Layer 4. In an example embodiment, the DPI engine 112 provides the offset value to the API engine 114. The API engine 114 uses the provided offset value to know when to disengage from processing the packet flow. That is, the API engine 114 uses the provided offset value to determine when to return the packet flow to the DPI engine 112.

Optionally, the DPI engine 112 may compare an advertised file extension obtained from the protocol control message, at 202, with an identified file extension (file type), obtained based on inspecting data at 206 and/or 214 (explained in further detail below). Based on whether the advertised file type matches the actual file type identified by the DPI engine 112, the reputation of the first device 102 (the client) may be adjusted accordingly. A client that consistently attempts to circumvent a file policy by changing file extensions (mismatch between advertised file extension and the identified file extension) may be placed in quarantine such that all packets from this first device 102 are provided to the DPI engine 112 and offloading is not available based on the reputation of the first device 102. In an example embodiment, the network security device 110 may obtain a device profile from another entity or may store the device profile internally in an access control list (ACL), for example. The first device 102 that has a low reputation may be flagged in the ACL such that all data arriving from the first device 102 is provided only to the DPI engine 112 and the offloading to the API engine 114 is blocked.

In an alternative example embodiment, the reputation changes may be communicated between the network security device 110 and a cloud intelligent service (not shown), for example. The reputation may be a numerical score. If the numeric score exceeds a predetermined threshold, the DPI engine 112 determines that the first device 102 associated with the reputation value may be malicious. Accordingly, the offloading to the API engine 114 is blocked e.g., by setting a flag in the ACL list stored on the network security device 110.

At 208, the API engine 114 receives the File A data of 1460 bytes from the second device 104. The API engine 114 compares the File A data bytes of 1460 bytes to the provided offset value of 2000 and determines that the File A data bytes are less than the byte offset value. That is, the received File A data bytes include the byte offset value of 2000.

At 210, the API engine 114 receives a data packet that contains the 2000-byte offset, and punts (the received data packets) to the DPI engine 112. At 212, the API engine 114 returns the packet flow including the 1460 bytes of the File A data to the DPI engine 112. At 214, the DPI engine 112 completes the file type identification and at 216 instructs the API engine 114 to process substantially the remaining length of the File A data.

In an example embodiment, the DPI engine 112 sets a new byte offset value to be approximately equal to the remaining length of the File A. In an example embodiment, the DPI engine 112 sets a new byte offset value to be approximately 10 bytes (substantially 4000 bytes of the File A data). The DPI engine 112 sets the byte offset value to be a predetermined byte amount before the expected transfer length to capture control data sequence and metadata fields that may appear at an end of the expected transfer length. For example, the DPI engine 112 sets the byte offset value 10 bytes before the expected full file length transfer of 4000 bytes to obtain a watermark metadata provided at the end of the File A data transfer. In an example embodiment, the byte offset value may vary depending on a file type as determined from the initial first few data packets and/or packets in the middle of the packet flow and/or at an end of the packet flow with respect to the first file transfer. The byte offset value is less than the expected transfer length such that the offloading is disengaged a few bytes before the entire file is transferred. The new byte offset value of 10 bytes, for example, is provided to the API engine 114.

At 218, the API engine 114 continues processing the packet flow until 10 bytes are left to be transferred of the File A data. The API engine 114 fast tracks or skips the inspection of the File A data bytes and at 220, the File A data 1080 bytes are provided to the API engine 114 and the remaining File A data bytes continue to be processed by the API engine 114 until 10 bytes of the File A data remain to be transferred. That is, the API engine 114 continues to process the File A data until a data packet that includes the 10-byte offset value is reached. At this point, the API engine 114 returns the packet flow (including the File A data that includes the 10 bytes offset) to the DPI engine 112 for deep packet inspection. As shown in FIG. 2, at least a portion of the packet flow is offloaded to the API engine 114 for faster throughput.

Figure 3:
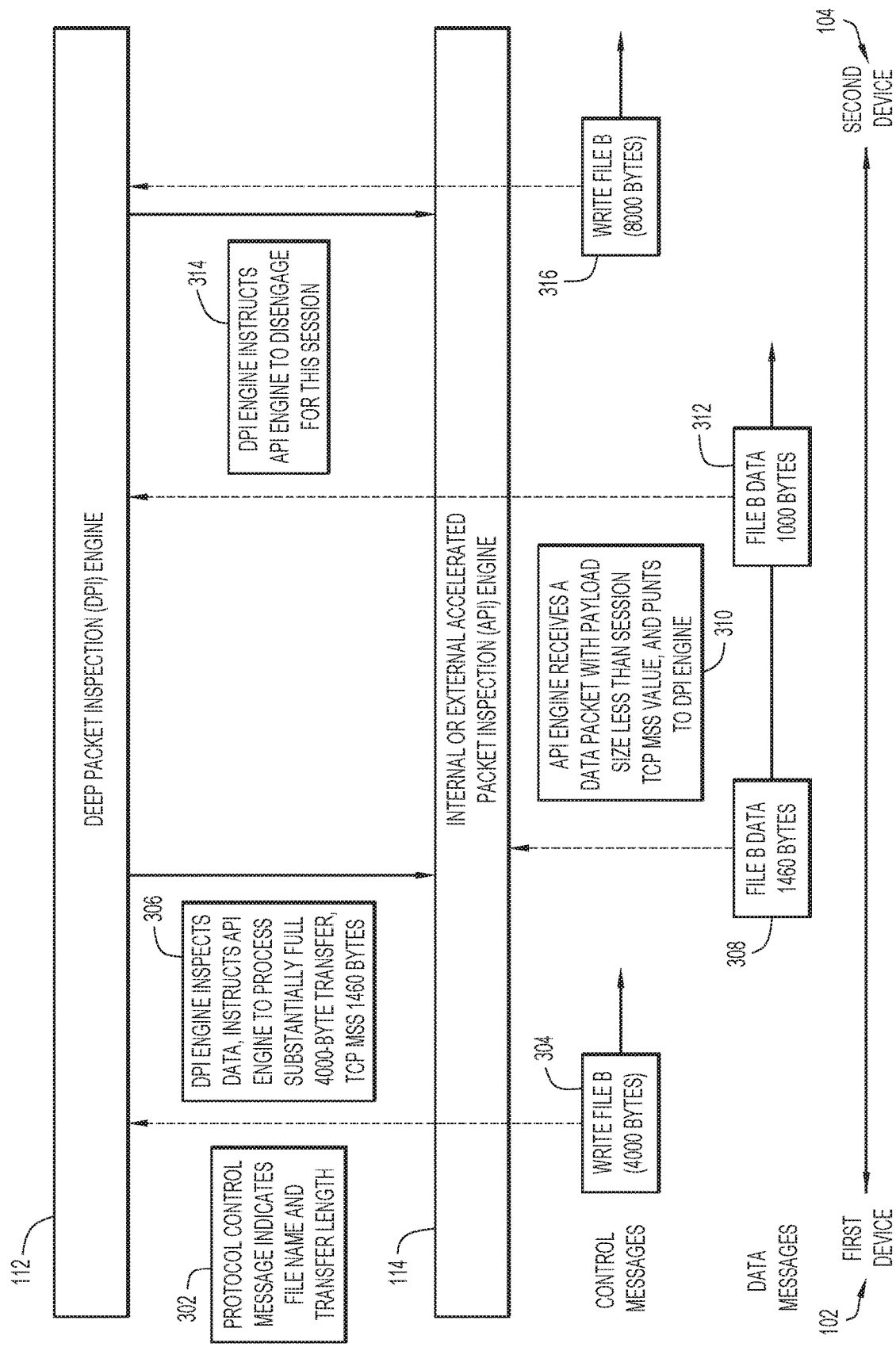
FIG. 3 is a functional flow diagram illustrating a method of interrupting the offloading of a packet flow as part of a process for contextual engagement and disengagement of file inspection, according to an example embodiment.

Reference is now made to FIG. 3. FIG. 3 is a flow diagram illustrating a method of interrupting the offloading of a packet flow as part of a process for contextual engagement and disengagement of file inspection, according to an example embodiment.

In an example embodiment, while in a hardware path, the network security device 110 monitors the total byte count and the packet size from whichever entity is transferring the data (capabilities of flow offload and similar engines), depending on whether a file is being read or written. If an entity that is transferring the file unexpectedly sends a smaller payload message (below TCP Maximum Segment Size (MSS) value for the session), the network security device 110 may assume that the transfer is interrupted and escalate the packet to the deep packet inspection path. Alternatively, for data transfers performed with the User Datagram Protocol (UDP), the network security device 110 may identity a smaller payload message by comparing its size to a configured interface Maximum Transmission Unit (MTU) value or sizes of previously transferred data packets. In other words, in an example embodiment, the network security device 110 may evaluate a predetermined number of previously transferred data packets and determine an average size for these previously transferred data packets. Based on the determined average size, a threshold value may be set (a value a predetermined number of bytes less than the average size) to detect the smaller payload message. Otherwise, the network security device 110 re-engages the deep packet inspection path shortly before the file transfer is complete, as explained above with reference to FIG. 2 (based on comparing transferred byte count to the advertised file length), in order to finish the file identification operation and prepare for inspecting subsequent control messages.

Some instances, however, may involve an early termination of the accelerated packet processing, as shown in FIG. 3. FIG. 3 illustrates a process for cancelling a file transfer offload handling. In an example embodiment, depicted in FIG. 3, the SMB protocol is used to share files via a network between various devices such as the first device 102 (a client device) and a second device 104 (a server). In the SMB protocol, the first device 102 transmits control messages indicating an operation to be performed and attributes of a specific file to be transferred. That is, each Read/Create/Write Request/Response message exchange contains information about a file name, a length of a file being transferred, and an optional offset for partial/resumed transfers, as explained above with reference to FIG. 2. In an example embodiment, the network security device 110 (depicted in FIG. 1) utilizes this information to offload at least a portion of the packet flow to an accelerated packet inspection. Since the DPI engine 112 and the API engine 114 are analogous to the ones described above with reference to FIG. 2, detailed description is omitted for the sake of brevity.

In FIG. 3, the API engine 114 performs minimal inspection of the data packets which includes Layer 3 and Layer 4 inspections to determine if the size of the payload of the data packet corresponds to the expected payload size. That is, the API engine 114 detects a cancellation or an interruption of the file transfer by monitoring the payload size of the data packets being fast tracked or offloaded to the accelerated packet processing.

At 302, a protocol control message is received by the DPI engine 112. The protocol control message includes at least an operation to be performed, a file name, and a transfer length. At 304, the control message is identified as a request message "write File B (4000 bytes)" transmitted from the first device 102 to the second device 104. That is, the control message identifies an operation to be a "write" operation. The file name is "File B" and the expected transfer length of the file B is 4000 bytes.

At 306, the DPI engine 112 inspects the data (the first few data packets in the packet flow) and instructs the API engine 114 to process a substantially full 4000-byte transfer. TCP MSS for the second device 104 is determined to be 1460 bytes based on TCP protocol header inspection by the DPI engine 112; this information is communicated to the API engine 114. In other words, the DPI engine 112 inspects the first few data packets of the packet flow to determine the file type and/or expected location of the file type information within the packet flow. In an example embodiment of FIG. 3, the file type information is obtained from the first few data packets and may also be obtained from the last few data packets. Accordingly, the offset value is set to substantially equal full length of the byte transfer. As explained above, with reference to FIG. 2, the byte offset value should be set a few bytes before the full 4000-byte transfer, for example, 10 bytes before the transfer is complete. The TCP MSS value is a maximum size of a payload of a data packet. The TCP MSS value is a parameter that may be specified in an options field of the TCP header of the first few data packets. Specifically, the TCP MSS value represents a maximum size of data (payload size) that can be received in a single TCP segment (packet). The API engine 114 receives the byte offset value (e.g., 10 bytes—substantially equal to full 4000 bytes transfer) and the expected TCP MSS value 1460 bytes. The API engine 114 then inspects the payload size of each offloaded data packet by comparing the TCP MSS value of the received packet provided in the TCP header of the data packet with the expected TCP MSS value received from the DPI engine 112.

At 308, the File B data is processed by the API engine 114 and the file B data is at 1460 bytes. At 310, the API engine 114 receives a data packet with a payload size less than the session TCP MSS value (1000 bytes, for example) and as such, the packet flow is punted to the DPI engine 112. At 312, the File B data 1000 bytes that is received by the API engine 114 is returned to the DPI engine 112. At 314, the DPI engine 112 instructs the API engine 114 to disengage for this session. That is, the packet flow is examined by the DPI engine 112 until a new byte offset value is set up by the DPI engine 112 for the API engine 114. At 316, a data packet with a payload size less than the expected session TCP MSS value may indicate that a control message is received such as Write File B (8000 bytes). Based on inspecting the payload sizes of the offloaded data of the packet flow, unexpected control data sequences are detected and processed by having the packet flow returned to the DPI engine 112.

While example embodiments described above focus on the SMB protocol due to its widely prevalent application, one of ordinary skill in the art would readily appreciate that example embodiments are applicable to other types of file transfer protocols as well. Various example embodiments can be applied to other potential file transfer protocols (FIPs) such as File service protocol, fast and secure protocol, Ethernet file transfer protocol, file delivery over unidirectional transport. FTP secure, HTTP secure, and so on.

While example embodiments described above focus on the DPI engine processing the control data sequences such as the control packets and setting offset values for the API engine, one of ordinary skill in the art would readily appreciate that example embodiments are applicable to other types of deployment scenarios. Various example embodiments can be applied to having a separate processing component at the network security device 110 which intercept the control message to determine expected file length, tile type, expected location of file attributes within the packet flow, expected payload size, and so on. The separate processing component may then direct the packet flow to the DPI for deep packet inspection or offload the packet flow to an accelerated packet processing path e.g., offload to a hardware path.

Example embodiments provide for provisioning for a fast-forwarding inspection to a later point in the file rather than skipping an entire length of the file. This could be useful for matching content that does not contain a magic value in the first few data packets; for example, a JPEG file contains a specific signature both at the beginning and at the end of a data stream.

Additionally, various example embodiments incorporate a provision for disengaging offload early based on encountering a data segment that is below the session TCP MSS in order to catch control messages that potentially indicate a cancelled/skipped file transfer. This is more efficient solution than trying to match on specific application protocol control fields in a hardware offload engine.

FIG. 4 is a flowchart illustrating a method 400 for offloading a packet flow, according to an example embodiment. The method 400 is performed by the network security device. In operation 402, the network security device obtains a packet flow of a file transfer session in which at least two files are transferred. In operation 404, the network security device determines at least an offset parameter based on at least one attribute of at least a first packet in the packet flow. The offset parameter is for a first file being transferred of the at least two files and relates to an expected positon of a control data sequence within the packet flow. At operation 406, based on the offset parameter, directing, by the network security device, to an accelerated packet inspection path instead of to a deep packet inspection path, a portion of the packet flow comprising one or more packets that follow the first packet.

According to one or more example embodiments, the offset parameter is a byte offset value that is less than an expected length of the at least one attribute provided in the at least first packet. The directing of the portion of the packet flow to the accelerated packet inspection path includes offloading the portion of the packet flow to the accelerated packet inspection path until reaching a second packet that includes the byte offset value and returning the packet flow including the second packet to the deep packet inspection path.

According to one or more example embodiments, the at least first packet is a control message of a server message block protocol, and indicates an operation to be performed, a file name of the first file, and an expected length of the first file. The method 400 may further include dynamically setting the offset parameter to be a predetermined amount of bytes less than the expected length of the first file.

According to one or more example embodiments, the method 400 may further include comparing, by the network security device, a transferred byte count of the packet flow to the offset parameter and returning the packet flow to the deep packet inspection path based on the transferred byte count being equal to or greater than the offset parameter.

According to one or more example embodiments, the at least first packet indicates an operation to be performed with respect to the first file, a file name of the first file, an expected length of the first file, and a protocol of the first file. The method 400 may further include, based on the protocol of the first file and the expected length of the first file, determining, by the network security device, the expected position of a data packet that includes a type attribute of the first file and setting the offset parameter to approximately correspond to the determined expected position of the data packet.

According to one or more example embodiments, the method 400 may further include, based on receiving, by the accelerated packet inspection path, a second packet which comprises the offset parameter, returning the packet flow including the second packet to the deep packet inspection path and updating the offset parameter to a new value based on the type attribute of the first file. The new value of the offset parameter includes a predetermined amount of bytes less than the expected length of the first file.

According to one or more example embodiments, the method 400 may further include, based on receiving a second packet which includes the offset parameter, returning the packet flow to the deep packet inspection path from the accelerated packet inspection path and based on the returning the packet flow to the deep packet inspection path, dynamically adjusting the offset parameter to a new value.

According to one or more example embodiments, the offset parameter is one of a first offset value, which is less than an expected total length of the first file, determined based on at least one of: the expected position of a data packet including a file type attribute determined to be toward an end of the first file or the expected position of the control data sequence determined to be in the first packet of the packet flow, or a second offset value, which is smaller than the first offset value, determined based on the expected position of the data packet including the file type attribute determined to be approximately at a middle of the first file.

According to one or more example embodiments, the method 400 may further include performing the deep packet inspection path, by a firewall engine at the network security device, with respect to the at least first packet of the packet flow and another portion of the packet flow that follows the portion of the packet flow offloaded to the accelerated packet inspection path. The deep packet inspection path is a detailed processing of each respective packet including checking for malicious code and formatting and the accelerated packet inspection path is one of an internal accelerated packet inspection path or an external accelerated packet inspection path in which a minimal packet inspection is performed and which is faster than the deep packet inspection path.

According to one or more example embodiments, the accelerated packet inspection path is at least one of: an external hardware offload engine, an internal hardware offload engine, or an internal software offloading. The minimal packet inspection excludes the checking for the malicious code and the formatting.

According to one or more example embodiments, the method 400 may further include forwarding the offset parameter, by a firewall engine of the network security device, to an offload engine which performs the accelerated packet inspection path. The firewall engine performs the deep packet inspection path. The method may further include returning the packet flow from the accelerated packet inspection path to the deep packet inspection path, based on the offload engine receiving a second packet that includes the offset parameter and based on the offload engine determining that a payload size of a third packet of the portion of the packet flow is less than an expected payload size, interrupting the directing of the portion of the packet flow to the accelerated packet inspection path, and returning the packet flow to the deep packet inspection path.

According to one or more example embodiments, the third packet includes the control data sequence indicating an interruption of a file transfer with respect to the first file or indicating an operation with respect to a second file of the at least two files, a file name of the second file, and a file size of the second file.

According to one or more example embodiments, the method 400 may further include determining, by the network security device, a type of the first file based on the at least one attribute included in the at least first packet, the at least first packet is one of a request control message or a response control message, detecting, by the network security device, a mismatch between the determined type of the first file and an actual type of the first file independently determined by the network security device, and adjusting, by the network security device, a reputation score of a first device transmitting the first file based on the detected mismatch.

According to one or more example embodiments, the method 400 may further include dynamically adjusting the directing of the packet flow to the accelerated packet inspection path based on the reputation score of the first device.

Figure 5:
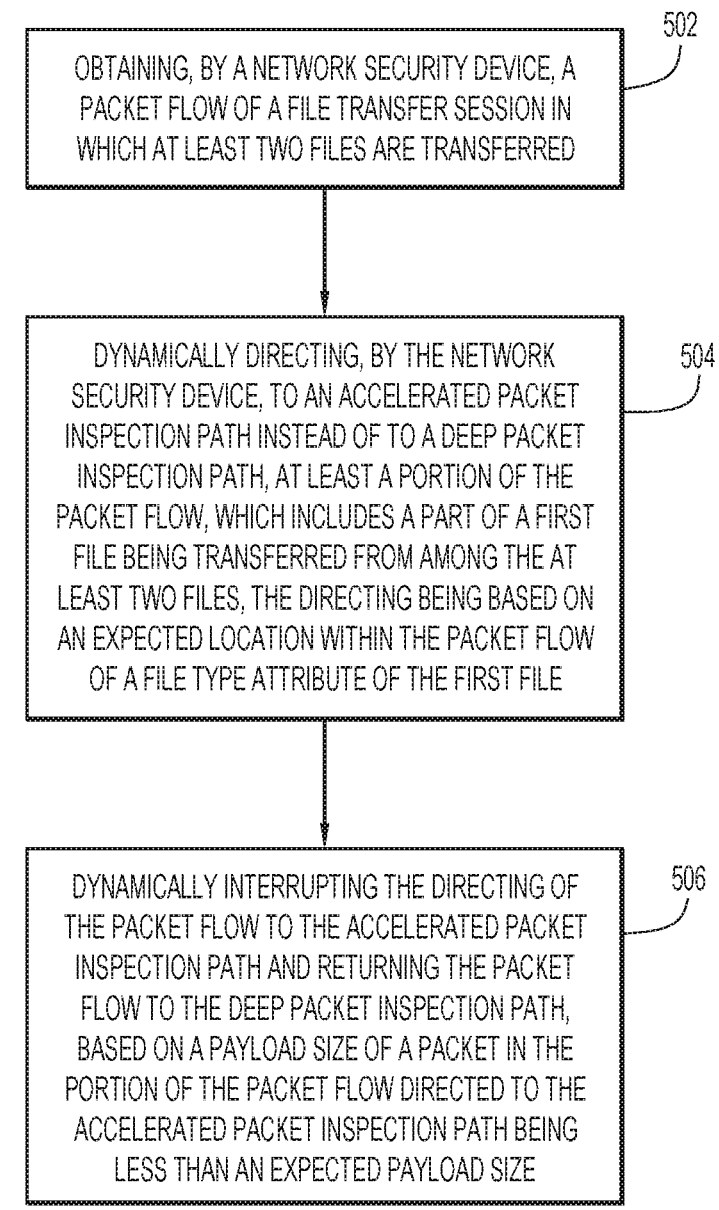
FIG. 5 is a flowchart illustrating a method for offloading a packet flow and interrupting the offloading of the packet flow as part of a process for contextual engagement and disengagement of file inspection, according to an example embodiment.

FIG. 5 is a flowchart illustrating a method 500 for offloading a packet flow and interrupting the offloading of the packet flow, according to an example embodiment. The method 500 is performed by the network security device. In operation 502, the network security device obtains a packet flow of a file transfer session in which at least two files are transferred. In operation 504, the network security device dynamically directs, to an accelerated packet inspection path instead of to a deep packet inspection path, at least a portion of the packet flow, which includes a part of a first file being transferred from among the at least two files. The directing is being based on an expected location within the packet flow of a file type attribute of the first file. At operation 506, dynamically interrupting the directing of the packet flow to the accelerated packet inspection path and returning the packet flow to the deep packet inspection path, based on a payload size of a packet in the portion of the packet flow directed to the accelerated packet inspection path being less than an expected payload size.

According to one or more example embodiments, the packet flow includes one of a plurality of Transmission Control Protocol (TCP) packets including the packet or a plurality of User Datagram Protocol (UDP) packets including the packet. The expected location of the file type attribute is determined by analyzing attributes of at least one control data sequence in a beginning of the packet flow. The packet flow includes a first set of packets from among the plurality of TCP packets or UDP packets, offloaded to the accelerated packet inspection path and the dynamically interrupting is performed at least a predetermined number of bytes before completing transfer of the first file.

According to one or more example embodiments, the packet with the payload size being less than the expected payload size is a control data sequence indicating one of an interruption of transferring the first file or an operation with respect to a second file of the file transfer session.

According to one or more example embodiments, the accelerated packet inspection path is lightweight inspection that is executed faster than the deep packet inspection path and the accelerated packet inspection path is an external hardware offload.

In still another example embodiment, a network security device (apparatus) is provided that includes a memory, a network interface unit configured to enable network communications, and a processor. The processor is configured to obtain a packet flow for a file transfer session in which at least two files are transferred; determine at least an offset parameter based on at least one attribute of at least a first packet in the packet flow, the offset parameter is for a first file being transferred of the at least two files and relates to an expected positon of a control data sequence within the packet flow; and based on the offset parameter, direct, to an accelerated packet inspection path instead of to a deep packet inspection path, a portion of the packet flow comprising one or more packets that follow the first packet.

According to one or more example embodiments, the offset parameter is a byte offset value that is less than an expected length of the at least one attribute provided in the at least first packet. The processor directs the portion of the packet flow to the accelerated packet inspection path by: offloading the portion of the packet flow to the accelerated packet inspection path until reaching a second packet that includes the byte offset value and returning the packet flow including the second packet to the deep packet inspection path.

Figure 6:
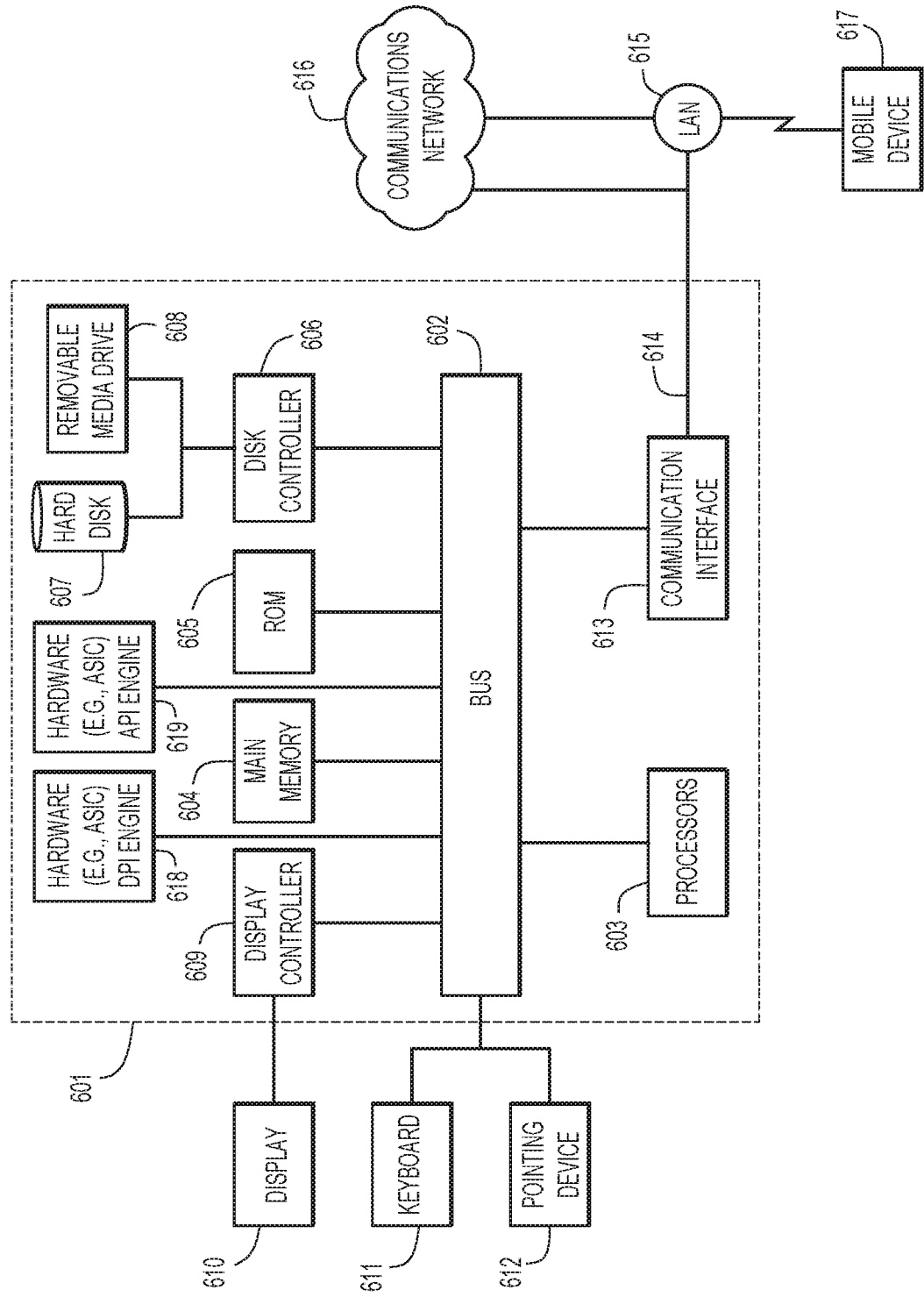
FIG. 6 is a block diagram illustrating a network security device configured to perform the offloading of the packet flows and the interrupting of the offloading, according to an example embodiment.

FIG. 6 is a block diagram illustrating a network security device 601 configured to perform the offloading of the packet flows and the interrupting of the offloading, according to an example embodiment.

With reference made to FIG. 6, illustrated therein is a network security device 601 upon which exemplary embodiments presented may be implemented. The network security device 601 may be programmed to implement a computer based device, executing one or more physical or virtual elements as depicted in FIGS. 1-3. The network security device 601 includes a bus 602 or other communication mechanism for communicating information, and a processor 603 coupled with the bus 602 for processing the information. While the figure shows the processor 603 as a single block, it should be understood that the processor 603 represent a plurality of processing cores, each of which may perform separate processing. The network security device 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The network security device 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The network security device 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the network security device 601 using an appropriate device interface (e.g., small computer system interface (SCSI), integrated device electronics (IDE), enhanced-IDE (E-IDE), direct memory access (DMA), or ultra-DMA).

The network security device 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices. As shown in FIG. 6, the network security device 601 includes two special purpose logic devices: a hardware DPI engine 618 and a hardware API engine 619, provided by way of an example only.

The network security device 601 may also include a display controller 609 coupled to the bus 602 to control a display 610, such as a cathode ray tube (CRT) or a light emitting diode (LED) display, for displaying information to a computer user. The network security device 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. The pointing device 612 may also be incorporated into the display device as, for example, a capacitive touchscreen and/or a resistive touchscreen. In addition, a printer may provide printed listings of data stored and/or generated by the network security device 601.

The network security device 601 performs a portion or all of the processing operations described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, exemplary embodiments are not limited to any specific combination of hardware circuitry and software.

As stated above, the network security device 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer may read.

Stored on any one or on a combination of non-transitory computer readable storage media, embodiments presented herein include software for controlling the network security device 601, for driving a device or devices for implementing the processes described herein, and for enabling the network security device 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The network security device 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local area network (LAN) 615 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the network security device 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The network security device 601 may transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

It should be appreciated that FIG. 6 provides only an illustration of one embodiment and does not imply any limitations with regard to the environments in which different embodiments may be implemented. Many modifications to the depicted environment may be made.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of example embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of example embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of example embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, by a network security device, a packet flow of a file transfer session in which at least two files are transferred;
determining, by the network security device, based on at least one attribute of at least a first packet in the packet flow, at least an offset parameter by setting the offset parameter to be a predetermined amount of bytes less than an expected length of a first file, wherein the offset parameter is for the first file being transferred of the at least two files and relates to an expected position of a control data sequence within the packet flow and setting the offset parameter is dynamic; and
directing, by the network security device, to an accelerated packet inspection path instead of to a deep packet inspection path, a portion of the packet flow comprising one or more packets that follow the first packet, until approaching or reaching the offset parameter, wherein the accelerated packet inspection path is one of an internal accelerated packet inspection path or an external packet inspection path in which less packet inspection is perform than in the deep packet inspection path,
wherein the first packet is a control message of a server message block protocol, and indicates an operation to be performed, a file name of the first file, and the expected length of the first file.

2. The method of claim 1, wherein the offset parameter is a byte offset value that is less than the expected length of the at least one attribute provided in the first packet, and
wherein the directing of the portion of the packet flow to the accelerated packet inspection path includes:
offloading the portion of the packet flow to the accelerated packet inspection path until reaching a second packet that includes the byte offset value; and
returning the packet flow including the second packet to the deep packet inspection path.

3. The method of claim 1, further comprising:
comparing, by the network security device, a transferred byte count of the packet flow to the offset parameter; and
returning the packet flow to the deep packet inspection path based on the transferred byte count being equal to or greater than the offset parameter.

4. The method of claim 1, wherein the at least two files are transferred between a first device and a second device in the file transfer session, wherein the first packet further indicates a protocol of the first file, and further comprising:
based on the protocol of the first file and the expected length of the first file, determining, by the network security device, an expected position of a data packet that includes a type attribute of the first file and setting the offset parameter to approximately correspond to the expected position of the data packet.

5. The method of claim 4, further comprising:
based on receiving, by the accelerated packet inspection path, a second packet which comprises the offset parameter, returning the packet flow including the second packet to the deep packet inspection path; and
updating the offset parameter to a new value based on the type attribute of the first file,
wherein the new value of the offset parameter comprises a predetermined amount of bytes less than the expected length of the first file.

6. The method of claim 1, further comprising:
based on receiving a second packet which comprises the offset parameter, returning the packet flow to the deep packet inspection path from the accelerated packet inspection path; and
based on the returning the packet flow to the deep packet inspection path, dynamically adjusting the offset parameter to a new value.

7. The method of claim 1, wherein the offset parameter is one of:
a first offset value, which is less than an expected total length of the first file, determined based on at least one of: an expected position of a data packet including a file type attribute determined to be toward an end of the first file or the expected position of the control data sequence determined to be in the first packet of the packet flow, or
a second offset value, which is smaller than the first offset value, determined based on the expected position of the data packet including the file type attribute determined to be approximately at a middle of the first file.

8. The method of claim 1, wherein the accelerated packet inspection path excludes checking for malicious code and formatting.

9. The method of claim 1, further comprising:
forwarding the offset parameter, by a firewall engine of the network security device, to an offload engine which performs the accelerated packet inspection path, wherein the firewall engine performs the deep packet inspection path;
returning the packet flow from the accelerated packet inspection path to the deep packet inspection path, based on the offload engine receiving a second packet that comprises the offset parameter; and
based on the offload engine determining that a payload size of a third packet of the portion of the packet flow is less than an expected payload size, interrupting the directing of the portion of the packet flow to the accelerated packet inspection path and returning the packet flow to the deep packet inspection path.

10. The method of claim 9, wherein the third packet includes the control data sequence indicating an interruption of a file transfer with respect to the first file or indicating an operation with respect to a second file of the at least two files, a file name of the second file, and a file size of the second file.

11. The method of claim 1, further comprising:
determining, by the network security device, a type of the first file based on the at least one attribute included in the first packet, the first packet is one of a request control message or a response control message;
detecting, by the network security device, a mismatch between the type of the first file and an actual type of the first file independently determined by the network security device; and
adjusting, by the network security device, a reputation score of a first device transmitting the first file based on the mismatch.

12. The method of claim 11, further comprising:
dynamically adjusting the directing of the packet flow to the accelerated packet inspection path based on the reputation score of the first device.

13. A method comprising:
obtaining, by a network security device, a packet flow of a file transfer session in which at least two files are transferred;
directing, by the network security device, to an accelerated packet inspection path instead of to a deep packet inspection path, at least a portion of the packet flow, which includes a part of a first file being transferred from among the at least two files, the directing being based on an expected location within the packet flow of a file type attribute of the first file, wherein the expected location of the file type attribute is determined by analyzing attributes of at least one control data sequence in a beginning of the packet flow; and interrupting the directing of the packet flow to the accelerated packet inspection path and returning the packet flow to the deep packet inspection path, based on a payload size of a packet in the portion of the packet flow directed to the accelerated packet inspection path being less than an expected payload size, wherein interrupting the directing of the packet flow to the accelerated packet inspection path is performed at least a predetermined number of bytes before completing transfer of the first file, wherein the packet flow includes one of a plurality of Transmission Control Protocol (TCP) packets including the packet or a plurality of User Datagram Protocol (UDP) packets including the packet, and the packet flow comprises a first set of packets from among the plurality of the TCP packets or the plurality of the UDP packets, offloaded to the accelerated packet inspection path.

14. The method of claim 13, wherein the packet with the payload size being less than the expected payload size is a control data sequence indicating one of an interruption of transferring the first file or an operation with respect to a second file of the file transfer session.

15. The method of claim 13, wherein the accelerated packet inspection path is lightweight inspection that is executed faster than the deep packet inspection path and wherein the accelerated packet inspection path is an external hardware offload.

16. A method comprising:
obtaining, by a network security device, a packet flow of a file transfer session in which at least two files are transferred;
determining, by the network security device, based on at least one attribute of at least a first packet in the packet flow, at least an offset parameter by setting the offset parameter to be a predetermined amount of bytes less than an expected length of a first file, wherein the offset parameter is for the first file being transferred of the at least two files and relates to an expected position of a control data sequence within the packet flow;
directing, by the network security device, to an accelerated packet inspection path instead of to a deep packet inspection path, a portion of the packet flow comprising one or more packets that follow the first packet, until approaching or reaching the offset parameter, wherein the accelerated packet inspection path is one of an internal accelerated packet inspection path or an external packet inspection path in which less packet inspection is performed than in the deep packet inspection path; and
performing the deep packet inspection path, by a firewall engine at the network security device, with respect to the first packet of the packet flow and another portion of the packet flow that follows the portion of the packet flow offloaded to the accelerated packet inspection path,
wherein the deep packet inspection path is a detailed processing of each respective packet including checking for malicious code and formatting, the accelerated packet inspection path is a minimal packet inspection, and the accelerated packet inspection path is faster than the deep packet inspection path.

17. The method of claim 16, wherein the accelerated packet inspection path is at least one of:
an external hardware offload engine,
an internal hardware offload engine, or
an internal software offloading.

18. The method of claim 16, wherein the minimal packet inspection excludes checking for the malicious code and the formatting.

19. The method of claim 16, further comprising:
based on returning the packet flow to the deep packet inspection path, dynamically adjusting the offset parameter to a new value.

20. The method of claim 16, wherein the offset parameter is a value determined based on the expected position of the control data sequence having a file type attribute determined to be approximately at a middle of the first file.

* * * * *